United States Patent
Hong et al.

(10) Patent No.: US 10,446,094 B2
(45) Date of Patent: Oct. 15, 2019

(54) GATE DRIVER ON ARRAY CIRCUIT AND LCD PANEL HAVING GOA PROTECTING CIRCUIT

(71) Applicant: WUHAN CHINA STAR OPTOELECTRONICS TECHNOLOGY CO., LTD, Wuhan, Hubei (CN)

(72) Inventors: Guanghui Hong, Hubei (CN); Gui Chen, Hubei (CN); Qiang Gong, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 96 days.

(21) Appl. No.: 15/319,755

(22) PCT Filed: Aug. 19, 2016

(86) PCT No.: PCT/CN2016/096058
§ 371 (c)(1),
(2) Date: Dec. 16, 2016

(87) PCT Pub. No.: WO2018/014412
PCT Pub. Date: Jan. 25, 2018

(65) Prior Publication Data
US 2018/0211612 A1 Jul. 26, 2018

(30) Foreign Application Priority Data
Jul. 21, 2016 (CN) .......................... 2016 1 0575503

(51) Int. Cl.
*G09G 3/36* (2006.01)
*G02F 1/133* (2006.01)
(Continued)

(52) U.S. Cl.
CPC .......... *G09G 3/36* (2013.01); *G02F 1/13306* (2013.01); *G02F 1/136286* (2013.01);
(Continued)

(58) Field of Classification Search
CPC .. G09G 3/36; G02F 1/13306; G02F 1/136286
See application file for complete search history.

(56) References Cited

U.S. PATENT DOCUMENTS 5,973,658 A     10/1999  Kim et al.
7,900,080 B2 *   3/2011  Lundberg .................. H03L 7/06
                                                    713/500
(Continued)

FOREIGN PATENT DOCUMENTS

CN     101359024 A    2/2009
CN     102914738 A    2/2013
(Continued)

*Primary Examiner* — Kwang-Su Yang
(74) *Attorney, Agent, or Firm* — Mark M. Friedman

(57) ABSTRACT

The present disclosure provides a gate driver on array (GOA) circuit, where the GOA circuit includes a GOA driving chip, a GOA driving signal line, an array substrate test chip, a test signal line, and a GOA protecting circuit. The GOA driving chip is used to generate a scan driving signal. The GOA driving signal line is used to transmit the scan driving signal to a corresponding scan line. The array substrate test chip is used to generate an array substrate test signal. The test signal line is used to transmit the array substrate test signal to the corresponding scan line. The GOA protecting circuit is arranged between the GOA driving signal line and the test signal line.

14 Claims, 2 Drawing Sheets

(51) Int. Cl.
*G02F 1/1362* (2006.01)
*G09G 3/00* (2006.01)

(52) U.S. Cl.
CPC ........... *G09G 3/006* (2013.01); *G09G 3/3677* (2013.01); *G09G 2300/0408* (2013.01); *G09G 2330/04* (2013.01)

(56) References Cited

U.S. PATENT DOCUMENTS

| | | |
|---|---|---|
| 8,138,781 B2 | 3/2012 | Wang et al. |
| 9,372,233 B2 | 6/2016 | Dia |
| 2002/0000965 A1* | 1/2002 | Ando ................... G09G 3/3677 345/87 |
| 2003/0046015 A1* | 3/2003 | Gotoh .............. G01R 31/31713 702/117 |
| 2008/0174577 A1* | 7/2008 | Fujita ................... G09G 3/3677 345/204 |
| 2016/0240120 A1 | 8/2016 | Du |

FOREIGN PATENT DOCUMENTS

| | | |
|---|---|---|
| CN | 103871341 A | 6/2014 |
| CN | 104992649 A | 10/2015 |
| CN | 105096781 A | 11/2015 |

\* cited by examiner

GATE DRIVER ON ARRAY CIRCUIT AND LCD PANEL HAVING GOA PROTECTING CIRCUIT

BACKGROUND

1. Field of the Disclosure

The present disclosure relates to the field of display driver, and more particularly to a gate driver on array (GOA) circuit and a liquid crystal display (LCD) panel.

2. Description

With the development of technology, more and more users use various liquid crystal display (LCD) panels to work, study, and do recreational activities. Thus, the users have higher requirements for the LCD panel, such as a high resolution, a high brightness, and a high refresh rate.

A gate driver on array (GOA) circuit is an important circuit driving the LCD panel in the LCD, where the GOA circuit is used to realize progressive driving of a gate line and normal display of the LCD panel. An array substrate test circuit is used to test status of electrical connections of the GOA circuit.

In designing a conventional LCD panel, signal lines of the GOA circuit, such as a starting signal line (STV), a forward scan signal line (U2D), and a reverse scan signal line (D2U) are coupled with a corresponding test signal line of the array substrate test circuit by wires. When the display of the LCD panel is normal or a static electricity test is performed, static electricity enters the GOA circuit through the test signal line of the array substrate test circuit, which damages the GOA circuit, further affecting normal operation of the entire LCD panel.

Therefore, it is necessary to provide a GOA circuit and an LCD panel to solve the above issue of the prior art.

SUMMARY

The aim of the present disclosure is to provide a gate driver on array (GOA) circuit and a liquid crystal display (LCD) panel to effectively avoid damage of static electricity caused by the GOA circuit and solve the issue that damage of static electricity is caused by the GOA circuit and the LCD panel, and the normal work of the whole LCD panel is affected.

The present disclosure provides the GOA circuit, where the GOA circuit comprises:

a GOA driving signal line transmitting the scan driving signal line to corresponding scan line;

an array substrate test chip generating an array substrate test signal;

a test signal line making the array substrate test signal transmit to the corresponding scan line; and a GOA protecting circuit arranged between the GOA driving signal line and the test signal line, and preventing a static electricity of the test signal line from being transmitted to the GOA driving signal line.

The GOA driving signal line comprises but is not limited to one or more of a starting signal line, a forward scan signal line, and a reverse scan signal line, a clock signal, a high level signal line, a low level signal line, and an enable signal line.

The GOA protecting circuit is a transmission gate circuit or an inverter circuit.

In the GOA circuit of the present disclosure, the GOA protecting circuit is the transmission gate circuit.

The transmission gate circuit comprises an N-type metal oxide semiconductor (NMOS) transistor and a P-type metal oxide semiconductor (PMOS) transistor.

An input end of the NMOS transistor is coupled with the test signal line, an output end of the NMOS transistor is coupled with the GOA driving signal line, and a control end of the NMOS transistor is coupled with a protecting control signal source.

An input end of the PMOS transistor is coupled with the test signal line, an output end of the PMOS transistor is coupled with the GOA driving signal line, and a control end of the PMOS transistor is coupled with the protecting control signal source by a NOT gate.

In the GOA circuit of the present disclosure, when the liquid crystal display (LCD) panel displays images, the protecting control signal source outputs a low level signal to disconduct the test signal line with the GOA driving signal line.

When the LCD panel displays the images, the protecting control signal source outputs a high level signal to conduct the test signal line with the GOA driving signal line.

In the GOA circuit of the present disclosure, the GOA protecting circuit is the inverter circuit.

The inverter circuit comprises a first N-type metal oxide semiconductor (NMOS) transistor, a second NMOS transistor, a first P-type metal oxide semiconductor (PMOS) transistor, and a second PMOS transistor.

An input end of the first NMOS transistor is coupled with a low level source, an output end of the first NMOS transistor is coupled with an input end of the second NMOS transistor, and a control end of the first NMOS transistor is coupled with a protecting control signal source.

An output end of the second NMOS transistor is coupled with the GOA driving signal line by a NOT gate, and a control end of the second NMOS transistor is coupled with the test signal line.

An input end of the first PMOS transistor is coupled with a high level source, an output end of the first PMOS transistor is coupled with an input end of the second PMOS transistor, and a control end of the first PMOS transistor is coupled with the protecting control signal source.

An output end of the second PMOS transistor is coupled with the GOA driving signal line by the NOT gate, and a control end of the second PMOS transistor is coupled with the test signal line.

In the GOA circuit of the present disclosure, when the liquid crystal display (LCD) panel displays images, the protecting control signal source outputs a low level signal to disconduct the test signal line with the GOA driving signal line.

When the LCD panel displays images, the protecting control signal source outputs a high level signal to conduct the test signal line with the GOA driving signal line.

The present disclosure provides the GOA circuit, where the GOA circuit comprises:

a GOA driving signal line transmitting the scan driving signal line to corresponding scan line;

an array substrate test chip generating an array substrate test signal;

a test signal line making the array substrate test signal transmit to the corresponding scan line; and a GOA protecting circuit arranged between the GOA driving signal line and the test signal line, and preventing a static electricity of the test signal line from being transmitted to the GOA driving signal line.

In the GOA circuit of the present disclosure, the GOA protecting circuit is the transmission gate circuit.

In the GOA circuit of the present disclosure, the transmission gate circuit comprises an N-type metal oxide semiconductor (NMOS) transistor and a P-type metal oxide semiconductor (PMOS) transistor.

An input end of the NMOS transistor is coupled with the test signal line, an output end of the NMOS transistor is coupled with the GOA driving signal line, and a control end of the NMOS transistor is coupled with a protecting control signal source.

An input end of the PMOS transistor is coupled with the test signal line, an output end of the PMOS transistor is coupled with the GOA driving signal line, and a control end of the PMOS transistor is coupled with the protecting control signal source by a NOT gate.

In the GOA circuit of the present disclosure, when the liquid crystal display (LCD) panel displays images, the protecting control signal source outputs a low level signal to disconduct the test signal line with the GOA driving signal line.

When the LCD panel displays the images, the protecting control signal source outputs a high level signal to conduct the test signal line with the GOA driving signal line.

In the GOA circuit of the present disclosure, the GOA protecting circuit is the inverter circuit In the GOA circuit of the present disclosure, the inverter circuit comprises a first N-type metal oxide semiconductor (NMOS) transistor, a second NMOS transistor, a first P-type metal oxide semiconductor (PMOS) transistor, and a second PMOS transistor.

An input end of the first NMOS transistor is coupled with a low level source, an output end of the first NMOS transistor is coupled with an input end of the second NMOS transistor, and a control end of the first NMOS transistor is coupled with a protecting control signal source.

An output end of the second NMOS transistor is coupled with the GOA driving signal line by a NOT gate, and a control end of the second NMOS transistor is coupled with the test signal line.

An input end of the first PMOS transistor is coupled with a high level source, an output end of the first PMOS transistor is coupled with an input end of the second PMOS transistor, and a control end of the first PMOS transistor is coupled with the protecting control signal source.

An output end of the second PMOS transistor is coupled with the GOA driving signal line by the NOT gate, and a control end of the second PMOS transistor is coupled with the test signal line.

In the GOA circuit of the present disclosure, when the liquid crystal display (LCD) panel displays images, the protecting control signal source outputs a low level signal to disconduct the test signal line with the GOA driving signal line.

When the LCD panel displays images, the protecting control signal source outputs a high level signal to conduct the test signal line with the GOA driving signal line.

In the GOA circuit of the present disclosure, the GOA driving signal line comprises but is not limited to one or more of a starting signal line, a forward scan signal line, and a reverse scan signal line, a clock signal, a high level signal line, a low level signal line, and an enable signal line.

The present disclosure further provides an LCD panel, where the LCD panel comprises the GOA circuit, where the GOA circuit comprises:

a GOA driving signal line transmitting the scan driving signal line to corresponding scan line;

an array substrate test chip generating an array substrate test signal;

a test signal line making the array substrate test signal transmit to the corresponding scan line; and a GOA protecting circuit arranged between the GOA driving signal line and the test signal line, and preventing a static electricity of the test signal line from being transmitted to the GOA driving signal line.

In the LCD of the present disclosure, the GOA protecting circuit is the transmission gate circuit.

In the LCD of the present disclosure, the transmission gate circuit comprises an N-type metal oxide semiconductor (NMOS) transistor and a P-type metal oxide semiconductor (PMOS) transistor.

An input end of the NMOS transistor is coupled with the test signal line, an output end of the NMOS transistor is coupled with the GOA driving signal line, and a control end of the NMOS transistor is coupled with a protecting control signal source.

An input end of the PMOS transistor is coupled with the test signal line, an output end of the PMOS transistor is coupled with the GOA driving signal line, and a control end of the PMOS transistor is coupled with the protecting control signal source by a NOT gate.

In the LCD of the present disclosure, when the LCD panel displays images, the protecting control signal source outputs a low level signal to disconduct the test signal line with the GOA driving signal line.

When the corresponding LCD panel displays images, the protecting control signal source outputs a high level signal to conduct the test signal line with the GOA driving signal line.

In the LCD of the present disclosure, the GOA protecting circuit is the inverter circuit.

In the LCD of the present disclosure, the inverter circuit comprises a first N-type metal oxide semiconductor (NMOS) transistor, a second NMOS transistor, a first P-type metal oxide semiconductor (PMOS) transistor, and a second PMOS transistor.

An input end of the first NMOS transistor is coupled with a low level source, an output end of the first NMOS transistor is coupled with an input end of the second NMOS transistor, and a control end of the first NMOS transistor is coupled with a protecting control signal source.

An output end of the second NMOS transistor is coupled with the GOA driving signal line by a NOT gate, and a control end of the second NMOS transistor is coupled with the test signal line.

An input end of the first PMOS transistor is coupled with a high level source, an output end of the first PMOS transistor is coupled with an input end of the second PMOS transistor, and a control end of the first PMOS transistor is coupled with the protecting control signal source.

An output end of the second PMOS transistor is coupled with the GOA driving signal line by the NOT gate, and a control end of the second PMOS transistor is coupled with the test signal line.

In the LCD of the present disclosure, when the LCD panel displays images, the protecting control signal source outputs a low level signal to disconduct the test signal line with the GOA driving signal line.

When the LCD panel displays the images, the protecting control signal source outputs a high level signal to conduct the test signal line with the GOA driving signal line Compared with the GOA circuit and the LCD panel of prior art, the GOA circuit and the LCD panel of the present disclosure effectively prevents the static electricity of the test signal line from causing damage of the GOA circuit by arrangement of the GOA protecting circuit, and solves the issue that damage of static electricity is caused by the GOA circuit and the LCD panel, and normal operation of the entire LCD panel is affected.

In order to more clearly illustrate the above content of the present disclosure, a description is made to the drawings which are needed for carrying out the embodiments. The description is as follow.

DETAILED DESCRIPTION

Figure 1:
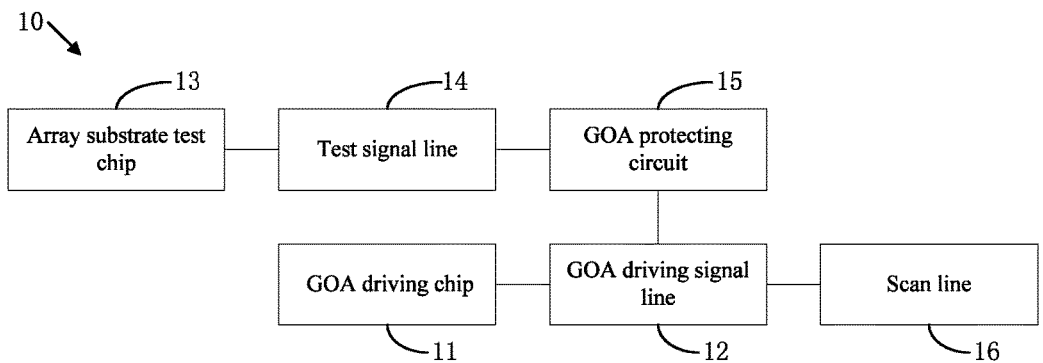
FIG. 1 is a structural diagram of a preferable embodiment of a gate driver on array (GOA) circuit of the present disclosure.

The following description of every embodiment with reference to the accompanying drawings is used to exemplify a specific embodiment, which may be carried out in the present invention. Directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but is not to limit, the present invention.

In the drawings, the components having similar structures are denoted by the same numerals.

As shown in FIG. 1, FIG. 1 is a structural diagram of a preferable embodiment of a gate driver on array (GOA) circuit of the present disclosure. The GOA circuit of the preferable embodiment of the present disclosure is used to provide a scan driving signal for a liquid crystal display (LCD) panel. The GOA circuit 10 comprises a GOA driving chip 11, a GOA driving signal line 12, an array substrate test chip 13, a test signal line 14, and a GOA protecting circuit 15.

The GOA driving chip 11 is used to generate a scan driving signal. The GOA driving signal line 12 is used to transmit the scan driving signal to a corresponding scan line 16. The array substrate test chip 13 is used to generate an array substrate test signal. The test signal line 14 is used to transmit the array substrate test signal to the corresponding scan line 16. The GOA protecting circuit 15 is arranged between the GOA driving signal line 12 and the test signal line 14, and is used to preventing static electricity of the test signal line 14 from being transmitted to the GOA driving signal line 12.

The GOA driving signal line 12 comprises but is not limited to one or more of a starting signal line (STV1), a forward scan signal line (U2D1), and a reverse scan signal line (D2U1), a clock signal (CK1), a high level signal line (VGH 1), a low level signal line (VGL1), and an enable signal line (GRST 1).

The test signal line 14 comprises but is not limited to one or more of a starting signal line (STV 2), a forward scan signal line (U2D 2), and a reverse scan signal line (D2U 2), a clock signal (CK 2), a high level signal line (VGH 2), a low level signal line (VGL 2), and an enable signal line (GRST 2).

Figure 2:
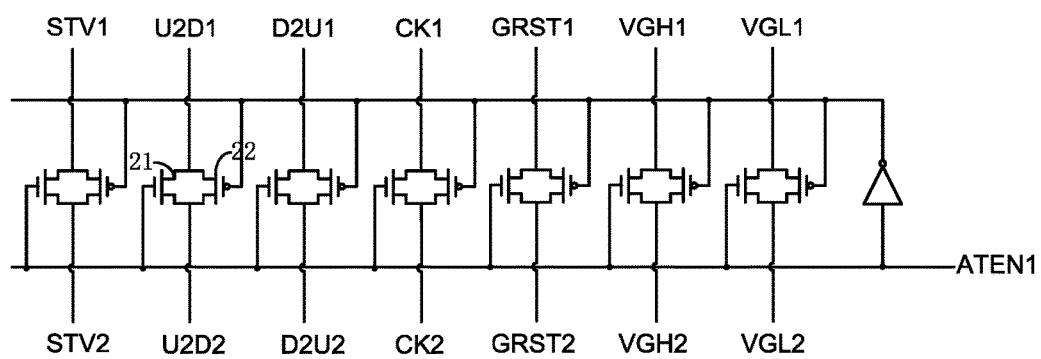
FIG. 2 is a specific circuit diagram of a GOA protecting circuit being a transmission gate circuit of a preferable embodiment of the GOA circuit of the present disclosure.

As shown in FIG. 2, FIG. 2 is a specific circuit diagram of the GOA protecting circuit being a transmission gate circuit of a preferable embodiment of the GOA circuit of the present disclosure. FIG. 2 is the specific circuit diagram of the transmission gate circuit. The transmission gate circuit comprises an N-type metal oxide semiconductor (NMOS) transistor 21 and a P-type metal oxide semiconductor (PMOS) transistor 22. An input end of the NMOS transistor 21 is coupled with the test signal line, an output end of the NMOS transistor 21 is coupled with the GOA driving signal line, and a control end of the NMOS transistor 21 is coupled with a protecting control signal source (ATEN 1). An input end of the PMOS transistor 22 is coupled with the test signal line, an output end of the PMOS transistor 22 is coupled with the GOA driving signal line, and a control end of the PMOS transistor 22 is coupled with the protecting control signal source (ATEN 1) by a NOT gate.

When the GOA circuit 10 of the preferable embodiment works, the LCD panel displays images, the protecting control signal source (ATEN 1) outputs a low level signal, the low level signal is input to the control end of the NMOS transistor 21, and the NMOS transistor 21 is in turn-off status. A high level signal is input to the control end of the PMOS transistor 22, and the PMOS transistor 22 also is in turn-off status. The test signal line not couple with the corresponding GOA driving signal line, which effectively preventing the static electricity of the test signal line 14 from being transmitted to the GOA driving signal line 12, and avoids damage of the GOA circuit from the static electricity.

When the corresponding LCD panel uses the test signal line to test the images, the protecting control signal source (ATEN 1) outputs the high level signal, and the high level signal is input to the control end of the NMOS transistor 21. The NMOS transistor 21 is in turn-on status, the low level signal is input to the control end of the PMOS transistor 22, and the PMOS transistor 22 also is in turn-on status. The test signal line is coupled with the corresponding GOA driving signal line, which allows the test signal line to perform an effective signal test for the GOA circuit.

Figure 3:
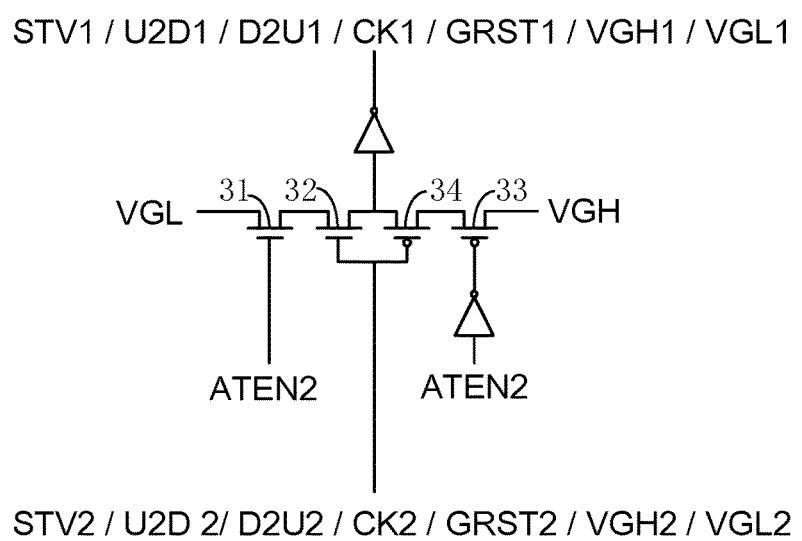
FIG. 3 is a specific circuit diagram of a GOA protecting circuit being an inverter circuit of a preferable embodiment of the GOA circuit of the present disclosure.

As shown in FIG. 3, FIG. 3 is a specific circuit diagram of a GOA protecting circuit being an inverter circuit of a preferable embodiment of the GOA circuit of the present disclosure. FIG. 3 is the specific circuit diagram of the inverter circuit, where the inverter circuit comprises a first N-type metal oxide semiconductor (NMOS) transistor 31, a second NMOS transistor 32, a first P-type metal oxide semiconductor (PMOS) transistor 33, and a second PMOS transistor 34.

An input end of the first NMOS transistor 31 is coupled with a low level source VGL, an output end of the first NMOS transistor 31 is coupled with an input end of the second NMOS transistor 32, and a control end of the first NMOS transistor 31 is coupled with a protecting control signal source (ATEN 2). An output end of the second NMOS transistor 32 is coupled with the GOA driving signal line by the NOT gate, and a control end of the second NMOS transistor 32 is coupled with the test signal line. An input end of the first PMOS transistor 33 is coupled with a high level source (VGH), an output end of the first PMOS transistor 33 is coupled with an input end of the second PMOS transistor 34, and a control end of the first PMOS transistor 33 is coupled with the protecting control signal source (ATEN 2). An output end of the second PMOS transistor 34 is coupled with the GOA driving signal line by the NOT gate, and a control end of the second PMOS transistor 34 is coupled with the test signal line.

When the GOA circuit 10 of the preferable embodiment works, the LCD panel displays the images, the protecting control signal source (ATEN 2) outputs a low level signal, the low level signal is input to the control end of the first NMOS transistor 31, and the first NMOS transistor 31 is in turn-off status. A high level signal is input to the control end of the first PMOS transistor 33, the first PMOS transistor 33 also is in turn-off status, thus, the input ends of the second NMOS transistor 32 and the second PMOS transistor 31 both have no signal. And the test signal line is uncoupled with the corresponding GOA driving signal line, which effectively prevents the static electricity of the test signal line 14 from being transmitted to the GOA driving signal line 12, and avoids damage of the GOA circuit from the static electricity.

When the corresponding LCD panel uses the test signal line to test the images, the protecting control signal source (ATEN 2) outputs the high level signal, the high level signal is input to the control end of the first NMOS transistor 31, the first NMOS transistor 31 is in turn-on status, the low level signal is input to the control end of the first PMOS transistor 33, the first PMOS transistor 33 also is in turn-on status. Thus, the low level signal is input to the second NMOS transistor 32 by the first NMOS transistor 31, and the high level signal is input to the second PMOS transistor 34 by the first PMOS transistor 33.

When the test signal line is at a high level, the second NMOS transistor 32 turns on, the second PMOS transistor 33 turns off, and the GOA driving signal line outputs the high level signal. When the test signal line is at a low level, the second PMOS transistor 34 turns on, the second NMOS transistor 32 turns off, and the GOA driving signal line outputs the low level signal, which allows the test signal line to perform an effective signal test for the GOA circuit.

As the above, driving processes of images display and display test of the GOA circuit of the preferable embodiment are finished.

The GOA circuit of the preferable embodiment effectively prevents the static electricity of the test signal line from causing damage of the GOA circuit by arrangement of the GOA protecting circuit.

The embodiment of the present disclosure further provides the LCD panel, where the LCD panel comprises the GOA circuit, the scan line, a data line and corresponding pixel unit. The GOA circuit comprises the GOA driving chip, the GOA driving signal line, the array substrate test chip, the test signal line, and the GOA protecting circuit.

The GOA driving chip is used to generate the scan driving signal line, the GOA driving signal line is used to transmit the scan driving signal line to the corresponding scan line, and the array substrate test chip is used to generate the array substrate test signal. The test signal line is used to transmit the array substrate test signal to the corresponding scan line. The GOA protecting circuit is arranged between the GOA driving signal line and the test signal line, and is used to prevent a static electricity of the test signal line from being transmitted to the GOA driving signal line.

Furthermore, the GOA protecting circuit is a transmission gate circuit.

Furthermore, the transmission gate circuit comprises the NMOS transistor and the PMOS transistor. The input end of the NMOS transistor is coupled with the test signal line, the output end of the NMOS transistor is coupled with the GOA driving signal line, and the control end of the NMOS transistor is coupled with the protecting control signal source. The input end of the PMOS transistor is coupled with the test signal line, the output end of the PMOS transistor is coupled with the GOA driving signal line, and the control end of the PMOS transistor is coupled with the protecting control signal source by the NOT gate.

Furthermore, when the LCD panel displays images, the protecting control signal source outputs the low level signal to disconduct the test signal line with the GOA driving signal line. When the LCD panel displays images, the protecting control signal source outputs the high level signal to conduct the test signal line with the GOA driving signal line.

Furthermore, the GOA protecting circuit is the inverter circuit.

Furthermore, the inverter circuit comprises the first NMOS transistor, the second NMOS transistor, the first PMOS transistor, and the second PMOS transistor. The input end of the first NMOS transistor is coupled with the low level source, the output end of the first NMOS transistor is coupled with the input end of the second NMOS transistor, and the control end of the first NMOS transistor is coupled with the protecting control signal source. The output end of the second NMOS transistor is coupled with the GOA driving signal line by the NOT gate, and the control end of the second NMOS transistor is coupled with the test signal line. The input end of the first PMOS transistor is coupled with the high level source, the output end of the first PMOS transistor is coupled with an input end of the second PMOS transistor, and the control end of the first PMOS transistor is coupled with the protecting control signal source. The output end of the second PMOS transistor is coupled with the GOA driving signal line by the NOT gate, and the control end of the second PMOS transistor is coupled with the test signal line.

When the LCD panel displays images, the protecting control signal source outputs the low level signal to disconduct the test signal line with the GOA driving signal line. The LCD panel displays the images, the protecting control signal source outputs the high level signal to conduct the test signal line with the GOA driving signal line.

Furthermore, the GOA driving signal line comprises but is not limited to one or more of the starting signal line, the forward scan signal line, and the reverse scan signal line, the clock signal, the high level signal line, the low level signal line, and the enable signal line.

A description of a specific operating principle of the LCD panel of the present disclosure is same as or similar with the description of the above GOA circuit of the preferable embodiment, and the description of the specific operating principle of the LCD panel refers to the related description of the above GOA circuit of the preferable embodiment.

The GOA circuit and the LCD panel of the preferable embodiment effectively prevents the static electricity of the test signal line from causing damage of the GOA circuit by arrangement of the GOA protecting circuit, and solves the issue that damage of static electricity is caused by the GOA circuit and the LCD panel, and the normal operation of the entire LCD panel is affected.

As the above, it should be understood that the present disclosure has been described with reference to certain preferred and alternative embodiments which are intended to be exemplary only and do not limit the full scope of the present disclosure as set fourth in the appended claims.

What is claimed is:

1. A gate driver on array (GOA) circuit, comprising
   a GOA driving chip generating a scan driving signal line;
   a GOA driving signal line transmitting the scan driving signal line to a corresponding scan line;
   an array substrate test chip generating an array substrate test signal;

a test signal line transmitting the array substrate test signal to the corresponding scan line; and a GOA protecting circuit arranged between the GOA driving signal line and the test signal line, and preventing static electricity of the test signal line from being transmitted to the GOA driving signal line, wherein the GOA driving signal line comprises at least one of a starting signal line, a forward scan signal line, a reverse scan signal line, a clock signal, a high level signal line, a low level signal line, and an enable signal line, wherein the GOA protecting circuit is a transmission gate circuit or an inverter circuit, wherein when a liquid crystal display (LCD) panel displays images, the protecting control signal source outputs a low level signal to disconduct the test signal line with the GOA driving signal line, and wherein when the LCD panel displays the images, the protecting control signal source outputs a high level signal to conduct the test signal line with the GOA driving signal line.

2. The GOA circuit as claimed in claim 1, wherein the GOA protecting circuit is the transmission gate circuit, the transmission gate circuit comprises an N-type metal oxide semiconductor (NMOS) transistor and a P-type metal oxide semiconductor (PMOS) transistor;

an input end of the NMOS transistor is coupled with the test signal line, an output end of the NMOS transistor is coupled with the GOA driving signal line, and a control end of the NMOS transistor is coupled with a protecting control signal source; and an input end of the PMOS transistor is coupled with the test signal line, an output end of the PMOS transistor is coupled with the GOA driving signal line, and a control end of the PMOS transistor is coupled with the protecting control signal source by a NOT gate.

3. The GOA circuit as claimed in claim 1, wherein the GOA protecting circuit is the inverter circuit, the inverter circuit comprises a first N-type metal oxide semiconductor (NMOS) transistor, a second NMOS transistor, a first P-type metal oxide semiconductor (PMOS) transistor, and a second PMOS transistor;

an input end of the first NMOS transistor is coupled with a low level source, an output end of the first NMOS transistor is coupled with an input end of the second NMOS transistor, and a control end of the first NMOS transistor is coupled with a protecting control signal source;

an output end of the second NMOS transistor is coupled with the GOA driving signal line by a first NOT gate, and a control end of the second NMOS transistor is coupled with the test signal line;

an input end of the first PMOS transistor is coupled with a high level source, an output end of the first PMOS transistor is coupled with an input end of the second PMOS transistor, and a control end of the first PMOS transistor is coupled with the protecting control signal source by a second NOT gate; and an output end of the second PMOS transistor is coupled with the GOA driving signal line by the first NOT gate, and a control end of the second PMOS transistor is coupled with the test signal line.

4. A gate driver on array (GOA) circuit, comprising
a GOA driving chip generating a scan driving signal line;
a GOA driving signal line transmitting the scan driving signal line to corresponding scan line;

an array substrate test chip generating an array substrate test signal;

a test signal line making the array substrate test signal transmit to the corresponding scan line; and a GOA protecting circuit arranged between the GOA driving signal line and the test signal line, and preventing static electricity of the test signal line from being transmitted to the GOA driving signal line, wherein when a liquid crystal display (LCD) panel displays images, the protecting control signal source outputs a low level signal to disconduct the test signal line with the GOA driving signal line, wherein when the LCD panel display the images, the protecting control signal source outputs a high level signal to conduct the test signal line with the GOA driving signal line.

5. The GOA circuit as claimed in claim 4, wherein the GOA protecting circuit is the transmission gate circuit.

6. The GOA circuit as claimed in claim 5, wherein the transmission gate circuit comprises an N-type metal oxide semiconductor (NMOS) transistor and a P-type metal oxide semiconductor (PMOS) transistor;

an input end of the NMOS transistor is coupled with the test signal line, an output end of the NMOS transistor is coupled with the GOA driving signal line, and a control end of the NMOS transistor is coupled with a protecting control signal source; and an input end of the PMOS transistor is coupled with the test signal line, an output end of the PMOS transistor is coupled with the GOA driving signal line, and a control end of the PMOS transistor is coupled with the protecting control signal source by a NOT gate.

7. The GOA circuit as claimed in claim 4, wherein the GOA protecting circuit is an inverter circuit.

8. The GOA circuit as claimed in claim 7, wherein the inverter circuit comprises a first N-type metal oxide semiconductor (NMOS) transistor, a second NMOS transistor, a first P-type metal oxide semiconductor (PMOS) transistor, and a second PMOS transistor;

an input end of the first NMOS transistor is coupled with a low level source, an output end of the first NMOS transistor is coupled with an input end of the second NMOS transistor, and a control end of the first NMOS transistor is coupled with a protecting control signal source;

an output end of the second NMOS transistor is coupled with the GOA driving signal line by a first NOT gate, and a control end of the second NMOS transistor is coupled with the test signal line;

an input end of the first PMOS transistor is coupled with a high level source, an output end of the first PMOS transistor is coupled with an input end of the second PMOS transistor, and a control end of the first PMOS transistor is coupled with the protecting control signal source by a second NOT gate; and an output end of the second PMOS transistor is coupled with the GOA driving signal line by the first NOT gate, and a control end of the second PMOS transistor is coupled with the test signal line.

9. The GOA circuit as claimed in claim 4, wherein the GOA driving signal line comprises at least one of a starting signal line, a forward scan signal line, a reverse scan signal line, a clock signal, a high level signal line, a low level signal line, and an enable signal line.

10. A liquid crystal display (LCD) panel, comprising:
a gate driver on array (GOA) circuit; wherein the GOA circuit comprises:

a GOA driving chip generating a scan driving signal line;
a GOA driving signal line transmitting the scan driving signal line to corresponding scan line;
an array substrate test chip generating an array substrate test signal;
a test signal line making the array substrate test signal transmit to the corresponding scan line; and
a GOA protecting circuit arranged between the GOA driving signal line and the test signal line, and preventing static electricity of the test signal line from be transmitted to the GOA driving signal line, and
wherein when a liquid crystal display (LCD) panel displays images, the protecting control signal source outputs a low level signal to disconduct the test signal line with the GOA driving signal line,
wherein when the LCD panel displays the images, the protecting control signal source outputs a high level signal to conduct the test signal line with the GOA driving signal line.

11. The LCD panel as claimed in claim 10, wherein the GOA protecting circuit is the transmission gate circuit.

12. The LCD panel as claimed in claim 11, wherein the transmission gate circuit comprises an N-type metal oxide semiconductor (NMOS) transistor and a P-type metal oxide semiconductor (PMOS) transistor;
an input end of the NMOS transistor is coupled with the test signal line, an output end of the NMOS transistor is coupled with the GOA driving signal line, and a control end of the NMOS transistor is coupled with a protecting control signal source; and
an input end of the PMOS transistor is coupled with the test signal line, an output end of the PMOS transistor is coupled with the GOA driving signal line, and a control end of the PMOS transistor is coupled with the protecting control signal source by a NOT gate.

13. The LCD panel as claimed in claim 10, wherein the GOA protecting circuit is an inverter circuit.

14. The LCD panel as claimed in claim 13, wherein the inverter circuit comprises a first N-type metal oxide semiconductor (NMOS) transistor, a second NMOS transistor, a first P-type metal oxide semiconductor (PMOS) transistor, and a second PMOS transistor;
an input end of the first NMOS transistor is coupled with a low level source, an output end of the first NMOS transistor is coupled with an input end of the second NMOS transistor, and a control end of the first NMOS transistor is coupled with a protecting control signal source;
an output end of the second NMOS transistor is coupled with the GOA driving signal line by a first NOT gate, and a control end of the second NMOS transistor is coupled with the test signal line;
an input end of the first PMOS transistor is coupled with a high level source, an output end of the first PMOS transistor is coupled with an input end of the second PMOS transistor, and a control end of the first PMOS transistor is coupled with the protecting control signal source by a second NOT gate; and
an output end of the second PMOS transistor is coupled with the GOA driving signal line by the first NOT gate, and a control end of the second PMOS transistor is coupled with the test signal line.

* * * * *